(12) United States Patent
O'Neil et al.

(10) Patent No.: US 8,074,422 B2
(45) Date of Patent: Dec. 13, 2011

(54) EMBEDDED PIPE HANGER

(75) Inventors: Virgil E. O'Neil, San Diego, CA (US);
Larry D. Brown, San Diego, CA (US);
Charles Price, San Marcos, CA (US)

(73) Assignee: Securus, Inc., San Diego, CA (US)

( * ) Notice: Subject to any disclaimer, the term of this patent is extended or adjusted under 35 U.S.C. 154(b) by 489 days.

(21) Appl. No.: 10/925,594

(22) Filed: Aug. 25, 2004

(65) Prior Publication Data
US 2005/0055960 A1    Mar. 17, 2005

Related U.S. Application Data

(60) Provisional application No. 60/497,848, filed on Aug. 26, 2003.

(51) Int. Cl.
*E04B 1/38*    (2006.01)
(52) U.S. Cl. ............. 52/700; 52/706; 52/707; 52/715; 248/56; 248/67.7; 248/300
(58) Field of Classification Search .......... 52/704, 52/706, 707, 712, 714, 715, 294, 295, 125.4, 52/698–700; 248/58, 65, 70, 71, 72, 230.1, 248/56, 57, 62, 67.7, 68.1, 74.1, 300
See application file for complete search history.

(56) References Cited

U.S. PATENT DOCUMENTS

| | | | | |
|---|---|---|---|---|
| 240,736 A | * | 4/1881 | Leeds | 248/65 |
| 800,170 A | * | 9/1905 | Potter | 248/71 |
| 991,517 A | * | 5/1911 | Kennedy | 52/708 |
| 1,362,245 A | * | 12/1920 | Farley | 248/58 |
| 1,578,947 A | * | 3/1926 | Alber | 52/370 |
| 1,745,858 A | * | 2/1930 | McCarty | 52/714 |
| 1,767,575 A | * | 6/1930 | Bujack | 52/369 |
| 1,768,246 A | * | 6/1930 | Gaddis | 52/708 |
| 1,922,479 A | * | 8/1933 | Joslin | 52/701 |
| 1,939,223 A | * | 12/1933 | Palmer | 403/398 |
| 2,141,032 A | * | 12/1938 | Cordell | 248/70 |
| 2,310,434 A | * | 2/1943 | Hyman | 248/71 |
| 2,438,419 A | * | 3/1948 | Schmidt | 174/163 F |

(Continued)

FOREIGN PATENT DOCUMENTS

JP    05263970 A    * 10/1993

*Primary Examiner* — Eileen D Lillis
*Assistant Examiner* — William Gilbert
(74) *Attorney, Agent, or Firm* — Stetina Brunda Garred & Brucker; Lowell Anderson

(57) ABSTRACT

A support bracket is provided for fastening to a concrete molding form. The bracket has a first and second distal end connected by a middle portion. The distal ends are generally in a first plane and the middle portion extends from a side of each distal end at an obtuse angle relative to that plane. The distal ends are releasably fastened to the form during use of the bracket, with the middle portion extending to be embedded in the concrete. After removal of the form, one or both of the distal ends are bent away from the concrete during use, with pipes being inserted through the openings in the distal ends. The support bracket may incorporate an internally-threaded and generally tubular structure attached to the middle portion of the support bracket, with one end of the tubular structure embedded in the concrete during use and the other end exposed at the plane of the concrete surface for useful access to the internal threads.

70 Claims, 9 Drawing Sheets

U.S. PATENT DOCUMENTS

| | | | | |
|---|---|---|---|---|
| 2,443,362 A * | 6/1948 | Tinnerman | | 70/370 |
| 2,687,788 A * | 8/1954 | Rapp | | 52/103 |
| 2,689,987 A * | 9/1954 | Berger | | 52/293.3 |
| 2,994,114 A * | 8/1961 | Black | | 52/317 |
| 3,266,761 A * | 8/1966 | Walton et al. | | 248/71 |
| 3,302,912 A * | 2/1967 | Hurlburt, Jr. | | 248/65 |
| 3,357,664 A * | 12/1967 | Geyer | | 248/74.4 |
| 3,405,497 A * | 10/1968 | McNair | | 52/699 |
| 3,750,360 A * | 8/1973 | Kingston | | 52/714 |
| 3,889,441 A * | 6/1975 | Fortine | | 52/715 |
| 4,040,589 A * | 8/1977 | McLay | | 248/300 |
| 4,360,178 A * | 11/1982 | Senter et al. | | 248/74.1 |
| 4,361,304 A * | 11/1982 | Younger | | 248/544 |
| 4,413,456 A * | 11/1983 | Gilb | | 52/295 |
| 4,445,303 A * | 5/1984 | Judkins | | 52/98 |
| 4,656,794 A * | 4/1987 | Thevenin et al. | | 52/22 |
| 4,901,957 A * | 2/1990 | Daigle et al. | | 248/62 |
| 4,945,704 A * | 8/1990 | Brown, Jr. | | 52/706 |
| 5,205,690 A * | 4/1993 | Roth | | 411/82 |
| 5,267,710 A * | 12/1993 | Condon | | 248/65 |
| 5,428,936 A * | 7/1995 | Roth | | 52/704 |
| 5,568,711 A * | 10/1996 | Popp et al. | | 52/704 |
| 5,628,161 A * | 5/1997 | Giannuzzi et al. | | 52/698 |
| 5,826,391 A * | 10/1998 | Underwood | | 52/414 |
| 6,010,099 A * | 1/2000 | Wertz et al. | | 248/55 |
| 6,061,990 A * | 5/2000 | McMahon | | 52/677 |
| 6,354,543 B1 * | 3/2002 | Paske | | 248/68.1 |
| 6,572,057 B1 * | 6/2003 | Roth | | 248/58 |
| 6,634,151 B1 * | 10/2003 | Roth | | 52/367 |
| 7,017,865 B2 * | 3/2006 | Zearbaugh | | 248/65 |
| 7,131,792 B2 * | 11/2006 | Doverspike | | 405/184.4 |
| 2005/0097851 A1 * | 5/2005 | Lubera et al. | | 52/698 |
| 2005/0109886 A1 * | 5/2005 | Zearbaugh | | 248/65 |
| 2005/0263651 A1 * | 12/2005 | Duponchelle | | 248/68.1 |

* cited by examiner

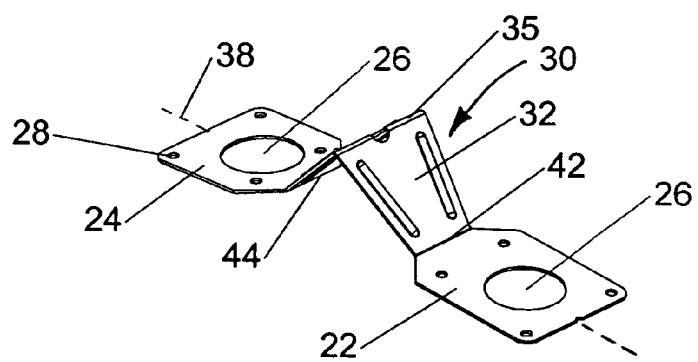
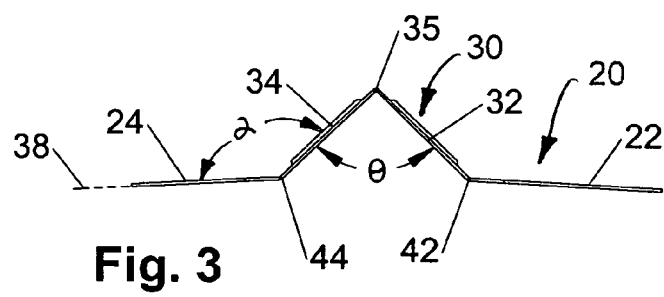
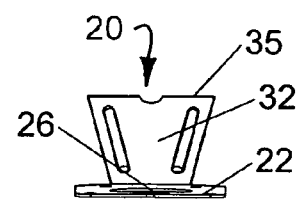
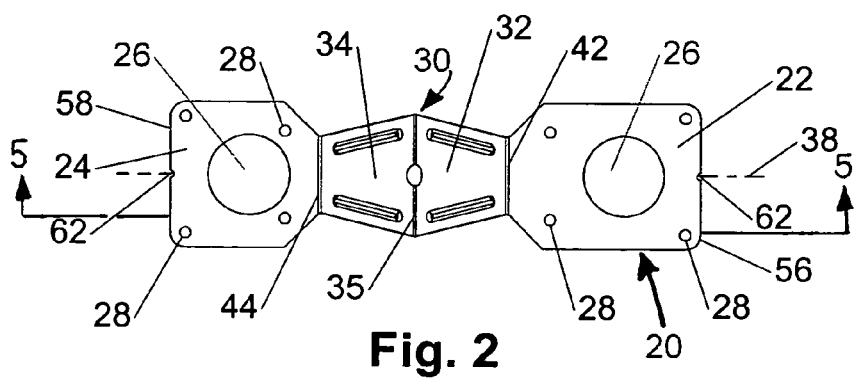

EMBEDDED PIPE HANGER

RELATED APPLICATION

This application claims the benefit under 35 U.S.C. §119 (e) of provisional application Ser. No. 60/497,848, filed Aug. 26, 2003, the complete content of which is incorporated herein by reference.

FIELD OF THE INVENTION

This invention relates to a method and apparatus for supporting tubes and other items from poured support structures such as concrete ceilings.

BACKGROUND OF THE INVENTION

It is often necessary to hang various pipes from ceilings of buildings. If the ceilings are made of poured concrete, then the supporting brackets can be nailed to the concrete. But because concrete is so hard, the nails must be driven by very high impact tools. Because concrete is brittle, the driving of such nails can crack the concrete. Moreover, the high-power nail guns must be held overhead to fasten the hangers to the ceiling. There is thus a need for a pipe support that does not require lifting heavy tools overhead, and which is easier to use, and which does not crack the concrete.

Alternatively, threaded fasteners may be embedded in the concrete either by drilling holes in the concrete after it has cured and inserting the fasteners into the holes, or by attaching the fasteners to the concrete form before pouring the concrete, thus later embedding the fasteners in the concrete. The first of these alternatives has the disadvantage of once again requiring heavy tools to be lifted overhead to drill holes, while both alternatives require multiple fasteners, brackets, etc., to accomplish the task of suspending the pipe. There is thus a need for a simplified bracket that reduces the effort and number of components required to suspend the pipe. Further, there is a need for a bracket that reduces the time devoted to each individual pipe suspension point, and which reduces the number of instances during the construction process that each pipe hanger must be addressed to successfully suspend the pipe.

Ceiling hangers are known in which part of the hanger is removably fastened to a form for pouring the concrete and part of the hanger extends from the form so it is embedded in the concrete, as described in U.S. Pat. Nos. 1,362,245, 1,745,858, and 1,767,575. But in these prior art hangers the projecting hangers often present sharp or pointed ends that could hurt someone if they fall on the projecting ends, and the ends could be stepped on during construction and easily bent out of position. There is thus a need for a bracket that reduces sharp ends and that can be stepped on during construction without unacceptably deforming the bracket.

SUMMARY

The above and other problems are solved by providing a bracket having an embedded portion that is a broad surface or an inclined or curved surface so as to reduce sharp ends. The surface is attached to the form at two spaced apart locations to restrain movement of the surface between those two locations and strengthen the surface therebetween and thus better resist deformation when stepped on during construction.

Advantageously, a framework is constructed to hold poured concrete while it hardens. A bracket is fastened to the framework so that part of the bracket remains at least partially embedded in the poured concrete after the framework is removed, and part of the bracket remains at least partially exposed after the framework is removed. The embedded portion of the bracket fastens the bracket to the concrete structure, which can be a floor, wall, ceiling, post or other structure. The embedded portion advantageously forms a raised structure, preferably triangular in cross-section, in order to provide additional strength if a worker steps on it before the concrete is poured and hardened. Stiffening ribs can be added to the embedded portion to further strengthen it to withstand being stepped on by workers. Portions of the bracket that are on opposing sides of the raised middle portion are fastened to the forms used to mold the concrete and that further reduces the risk of unacceptable deformation of the middle portion of the bracket during construction.

The partially exposed portion of the bracket can be bent away from the concrete to form the desired support for any desired item. Preferably the partially exposed portion comprises one or more distal ends of the bracket, and each distal end preferably has at least one opening offset from another opening located either on the same distal end or on an opposing distal end of the bracket. The openings in two distal ends can be aligned to provide two points of support to an item such as a pipe. Alternatively, and preferably, the openings are offset to allow for different locations of the supported items such as pipes. Various numbers of openings and various arrangements of openings in the distal ends can be used.

In a further embodiment a tube can be fastened to the middle portion. The tube has an embedded end and an exposed end with the embedded end being embedded in concrete during use, and the exposed end being accessible from the surface of the poured concrete during use of the bracket. The exposed end of the tube is preferably perpendicular to the concrete form during installation, and thus is perpendicular to the surface of the concrete when the bracket is embedded in the concrete. The tube advantageously has internal threads and preferably larger diameter threads, and also has smaller diameter threads more toward the embedded end. That allows two different diameter rods or shafts to be threaded into the tube when it is embedded in the concrete. The tube preferably fits between the bracket and the concrete surface, but could extend through the bracket so the embedded end is deeper in the concrete than the middle portion of the bracket to which the tube is preferably, but optionally fastened.

BRIEF DESCRIPTION OF THE DRAWINGS

These and other advantages of the invention will be more apparent in view of the following drawings in which like numbers refer to like parts throughout, and in which:

FIG. 1 is an elevated perspective view of a bracket of this invention;

FIG. 2 is a top plan view of the bracket of FIG. 1;

FIG. 3 is a side view of the bracket of FIG. 1;

FIG. 4 is an end view of the bracket of FIG. 1, with the opposing end being the mirror image thereof;

DETAILED DESCRIPTION

Figure 5:
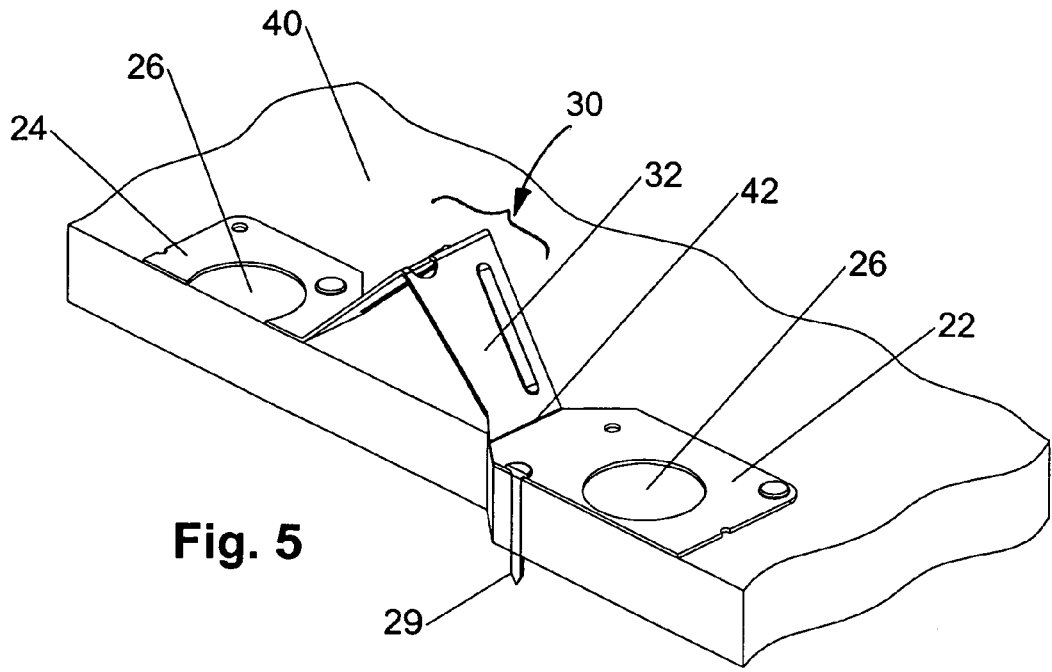
FIG. 5 is an upper perspective view of a section of the bracket of FIG. 1 fastened to a form for poured concrete and taken along 5-5 of FIG. 2.

Referring to FIGS. 1-6, a bracket 20 is shown having two distal ends 22, 24 which are preferably, but optionally opposing each other. One or more openings 26 are placed in each distal end. The openings 26 are preferably sized and shaped to accommodate an item to be held by the bracket 20. A common item to be held is a tube, such as a water pipe, gas pipe, electrical conduit or other tubular structures, in which case the openings 26 are preferably circular and slightly larger in size than the tube to be inserted through the opening. Openings 26 may also be enlarged slightly to accommodate secondary structures such as plastic insulators or acoustic isolators surrounding the pipe, conduit or other tubular structures.

A plurality of fastener holes 28 are preferably, but optionally provided in the distal ends 22, 24, and sized to allow the passage of removable fasteners 29 (FIGS. 5-6) such as nails or screws. A middle portion 30 extends between and joins the distal ends 22, 24. The middle portion 30 is preferably formed of two inclined side portions 32, 34 with side portion 32 joining distal end 22, and side portion 34 joining end 24, and portions 32, 34 being joined together at a ridge 35. Thus the side portion 32 is associated with the adjacent distal end 22 and side portion 34 is associated with adjacent distal end 24. The side portions 32, 34 preferably join at an angle along ridge line 35. In order to reduce stress concentrations within the concrete 46, the juncture of side portions 32, 34 could be curved. A radius of curvature of less than 0.5 inches is believed advantageous and a curvature with a radius less than about 0.25 inches is believed preferable, but larger curvatures could be used.

The ridge 35 is advantageously not a sharp point, but is preferably rounded or curved so as to avoid a sharp surface that may injure someone falling against it. Further the length of the ridge 35 is advantageously sufficient to provide an area of contact sufficient to reduce injury to a person falling against the ridge 35. A length of about 1 inch (2.5 cm) is believed suitable, but lengths of about 1.5 to 2.5 inches (about 3.8-6.3 cm) are more advantageous, with a length of about 2 inches (5 cm) being preferred. The length of the ridge 35 corresponds to the width of the bracket 20 at the location of the ridge 35.

As best seen in FIGS. 1, 3 and 4, the distal ends 22, 24 are generally in the same plane and have the side portions 32, 34 inclined out of the plane to intersect at ridge 35, like the roof of a house. The side portions 32, 34 are inclined relative to the adjacent distal ends 22, 24 at an obtuse angle α that is preferably, but optionally about 135°, and advantageously between about 120° to 150° but the precise angle can vary. The side portions 32, 34 are preferably at an angle θ of about 90° relative to each other, and advantageously between about 60° to 105°, but the angle can also be larger or smaller.

The inclined side portions 32, 34 help stiffen the middle portion 30 so it can be stepped on by workers without deforming so much that it cannot be embedded in concrete to provide an effective support, and preferably stiffen it enough so it does not substantially deform when stepped on when it is fastened to a concrete form during construction. As the angles of inclination of the side portions 32, 34 relative to form 40 exceed 45° the side portions become more vertical and they become better able to resist a force perpendicular to the form 40. But they also become less able to withstand side forces along axis 38 or in the plane of the form 40.

The side portions 32, 34 preferably have bend lines 42, 44 located at the transition between the side portions and the distal end 22, 24 associated with each side portion 32, 34. The bend lines also help stiffen and strengthen the middle portion. As seen in FIG. 3, the distal ends 22, 24 are generally planar and in the same plane.

Stiffening ridges 36 (FIG. 9) can be formed in the side portions 32, 34 to strengthen the middle portion 30 against being stepped on. The ridges 36 are preferably stamped into the side portions 32, 34 when the bracket is made of metal or integrally molded when the bracket is made of plastic. The ridges 36 preferably extend generally along the longitudinal axis 38 of the bracket 20 to help resist the inclined portions 32, 34 from being forced into or toward the plane of the distal ends 22, 24. Alternatively phrased, the stiffening ridges preferably, but optionally extend so they intersect the ridge 35 at an angle approaching 90°. The ridges 36 could be formed by other means, such as affixing additional material, such as rods or bars welded to the bracket. The ridges 35 and 36 provide means for strengthening the middle portion 30 so it can be stepped on by workers without reducing the function of the bracket to an unacceptable level.

The width of the bracket 20 at the bend lines 42, 44 is preferably, but optionally, smaller than the width at ridge line 36. The larger width at ridge line 36 provides more area to engage the concrete during use of the bracket, and at a location further within the concrete.

Referring to FIG. 5, the bracket 20 is fastened to a building form 40 that is used as part of the form for pouring concrete into a predetermined shape. The bracket 20 is held to the side of the form 40 that will abut the concrete. The distal ends 32, 34 are held against the form 40, while the middle portion 30 extends away from the form 40 and away from distal ends 22, 24. Fasteners 29, preferably being nails for ease of release from the form when the form is peeled away from the concrete, pass through the fastener holes 28 to affix the bracket to the form 40. Different sized holes 28 accommodate different sized fasteners 29 and fasteners 29 may optionally be of other types than nails and screws. The brackets 20 are located at predetermined locations on the forms so as to position the brackets 20 at the locations and orientations desired by the user.

Enough fasteners 29 are used so the bracket 20 is held in place and so that a worker can step on the bracket without unacceptably deforming it. Preferably, at least one fastener 42 is used to fasten each distal end 22, 24 to the form. If only one distal end 22 or 24 is fastened to the form 40, then a worker stepping on the middle portion 30 could flatten the bracket. Using a fastener 42 in each end 22, 24 prevents the ends from moving away from each other and thus cooperates with the shape of the middle portion 30 to help prevent undesirable deformation. The fasteners 29 must thus be sufficiently strong to withstand the forces exerted when a worker steps on the bracket 20, and preferably strong enough to allow workers to repeatedly step on the middle portion 30. More fasteners 29 may be needed for brackets 20 located in well traveled portions of the form(s) 40. The fasteners 29 also preferably hold the distal ends 22, 24 flush against the surface of the form 40 so there is no space between the facing surfaces of the distal end and the abutting form.

Figure 6:
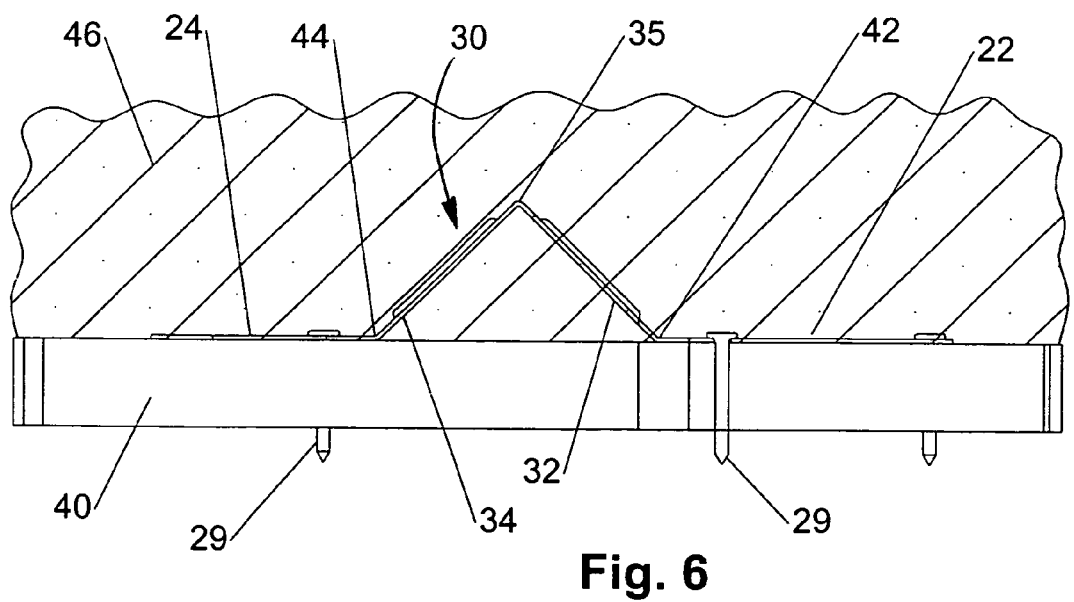
FIG. 6 is a side view of the bracket and form of FIG. 5 embedded in concrete.

Referring to FIGS. 5 and 6, concrete 46 is poured against the surface of the form 40 to which the bracket 20 is fastened. The concrete 46 is fluid when poured, and flows between the form 40 and the raised middle portion 30 so the middle portion extends into and is embedded in the concrete. The distal ends 22, 24 are held against the form 40 by fasteners so the fluid concrete does not get between the form 40 and one of the ends 22, 24, or so that only a small portion of concrete gets between those parts.

Figure 7:
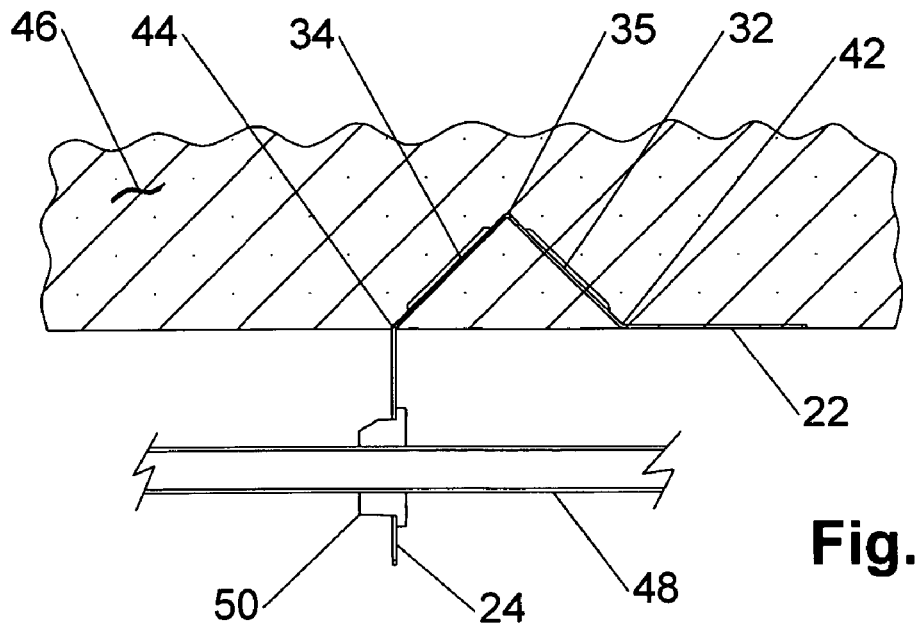
FIG. 7 is a sectional view showing the bracket of FIG. 1 in use.

Referring to FIGS. 6 and 7, after the concrete 46 hardens the form(s) 40 are removed leaving the middle portion 30 of the bracket 20 embedded in the concrete 46. One or more of the distal ends 22, 24 can be bent away from the concrete 46 which forms a wall, ceiling or floor. FIG. 7 shows only one distal end 24 in use with the other end 22 abutting the concrete, but either or both ends could be used to hold tubes and other things. The distal ends 22, 24 are preferably bent perpendicular to the concrete for use. The fasteners 29 can then be removed from the concrete or from the distal end 22, 24 through which the fastener extends.

A device to be supported by the bracket 20 is then fastened to one or both of the ends 22, 24. Preferably the device to be supported comprises a tube 48 such as a plumbing pipe or electrical conduit that preferably, but optionally passes through the opening 28 in one or both of the distal ends 22, 24. The opening 28 is advantageously sized to allow the passage of the tube 48. An undulating edge can be formed on the edges of the distal ends 22, 24 that define the openings 28, as described in U.S. Pat. No. 6,375,128, the complete contents of which are incorporated herein by reference. Thus the edges of the opening 28 could be undulating. Similarly, the opening 28 could be firnished with other features to accept other shapes of devices, such as the radial notches adapted to the curved pipe support bracket as described in U.S. Pat. No. 6,467,734, the contents of which are incorporated herein by reference.

An insert 50 can be interposed between the distal end 22, 24 and the tube 48 in order to prevent the edges forming opening 28 from abrading or damaging the tube 48. The inserts 48 can take various forms, and may include the type described in U.S. Pat. No. 6,158,066, the complete contents of which are hereby incorporated by reference, and may further include those described in U.S. Pat. No. 4,550,451, the complete contents of which is incorporated herein by reference. If an insert is used the opening 28 is sized to accommodate the insert 50 and the tube 48.

The forms 40 are typically used to define the shape of the concrete wall or ceiling. But the form 40 could comprise a small piece of material having a surface with a desired contour (usually flat) that abuts the concrete when the concrete is still fluid. Such a form 40 can be small, only slightly larger than the bracket and need be only large enough to prevent the bracket 20 and attached form 40 from sinking unacceptably into the concrete. For pouring floors, a small flat sheet of material can be used for form 40, and the middle portion 30 embedded in the floor while the concrete is fluid enough to entrain the middle portion 30, and with the form 40 forming the surface texture of the abutting concrete. For floors, the form 40 may be omitted and brackets 20 inserted so as to embed the middle portion 30 in the concrete.

Figure 8:
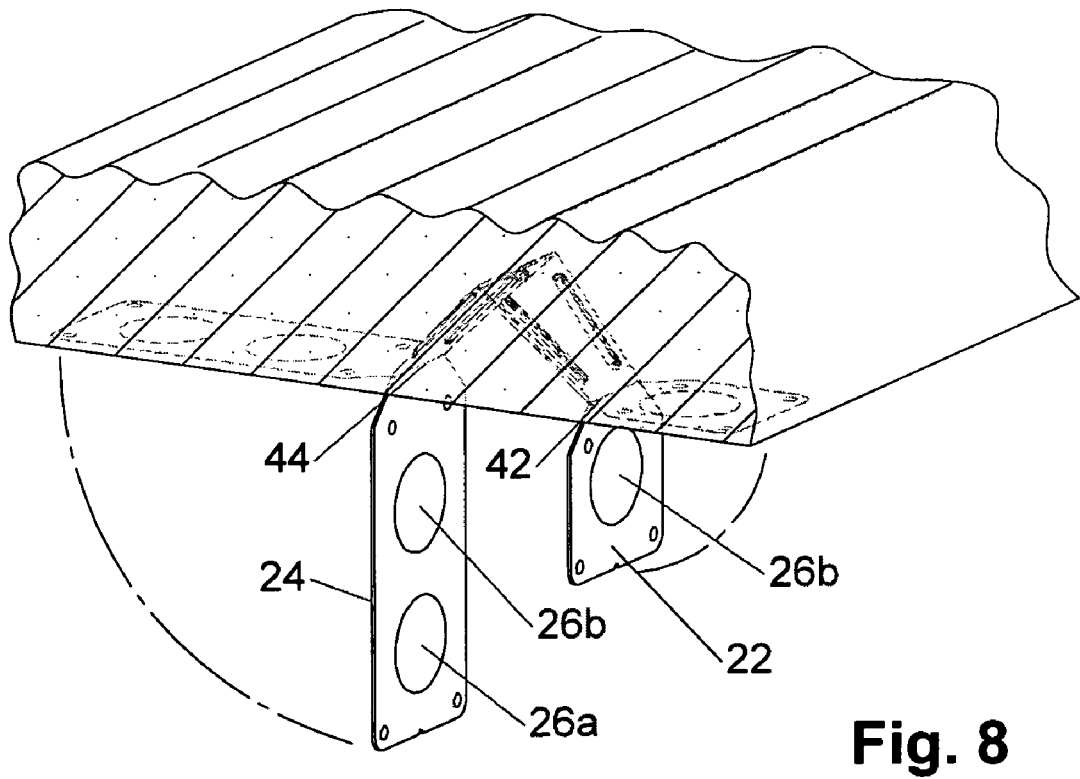
FIG. 8 is a first alternative embodiment of the bracket of this invention.

Referring to FIG. 8, in a further embodiment the distal ends 22, 24 are of different length so the center of the openings 26a, 26b are offset different distances from the adjacent fold line 42, 44. The offset location of the openings 26 allows the bracket 20 to hold pipes at different distances relative to the original, pre-installation plane in which the distal ends 22, 24 initially lie, or relative to the plane of the fold lines 42, 44. Thus, a single bracket 20 allows a tube 48, such as a plumbing pipe, to be held two different distances from the wall or ceiling. That ability to offset the pipes using a single bracket also makes it easier to allow pipes to cross one another. By first installing at least a pair of brackets 20 so that their distal ends 22, 24 will lie in planes perpendicular to each other when folded away from the concrete at fold lines 42, 44, and subsequently selecting openings 26 in the brackets 20 which differ in distance from fold lines 42, 44 in each bracket 20, tubes 48 inserted in the openings may pass each other at right angles without contacting each other.

As seen in FIG. 8, one or both distal ends 22, 24 can have more than one opening 26 in it. In the illustrated bracket 20 distal end 24 has two openings 26a, 26b originally aligned on a longitudinal axis 38 (FIG. 2) but bent at an angle thereto, preferably bent perpendicular to that axis, so that two of the openings 26b align along an axis parallel to but offset from axis 38 (FIG. 2). The openings 26 closest to the fold lines 42, 44 thus align so that a tube 48 can be inserted through the aligned openings. Another tube at a different height from the fold lines 42, 44 can be inserted through the third opening 26a in end 24. From this disclosure it should be understood that only one opening 26 is required per bracket to provide support for the tube 48, so that the three illustrated openings 26a and 26b in FIG. 8 could optionally lie at three distinct distances from the fold lines 42, 44, thus allowing either distal end 22, 24 to be selectively bent downward, and any of the three openings 26 then to be used as a sole support for tube 48

Figure 9:
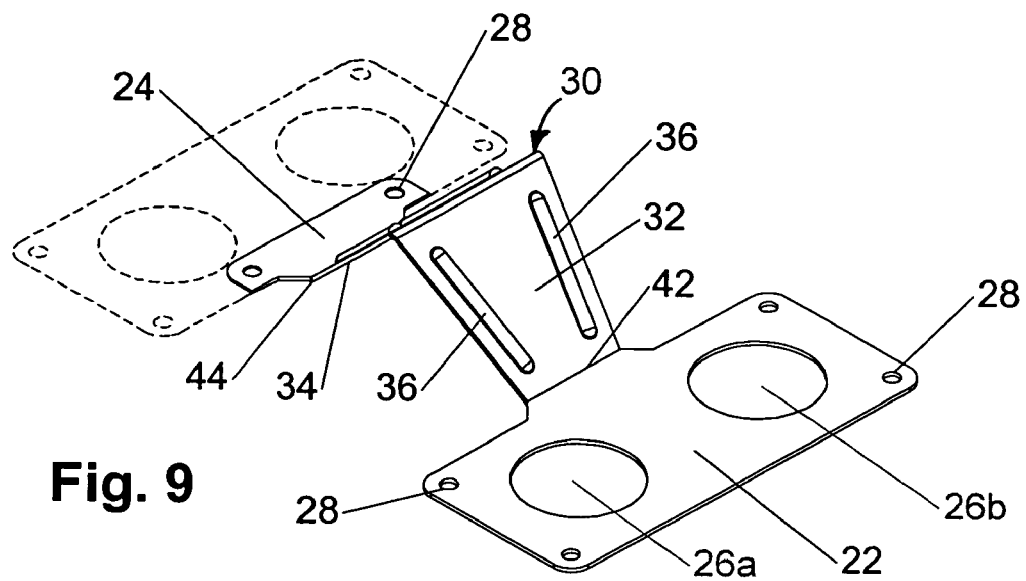
FIG. 9 is a sectional view showing a bracket with distal ends of two different lengths.

Referring to FIG. 9, a further embodiment is shown in which first distal end 22 has two laterally aligned openings 26a, 26b and one or more holes 28 for fasteners to fasten the bracket 20 to the form 40 (FIG. 6). While two openings 26 are shown, more than two opening could be provided by enlarging the distal end 22 appropriately to accommodate the required number and size of the openings. The openings 26a, 26b allow two tubes 48 to be held by bracket 20 lateral to each other, in a side by side configuration, laterally spaced by the distance between the openings 26a, 26b. Stiffening ribs 36 are advantageously, but optionally placed on side portions 32, 34 to prevent collapse or unacceptable deformation of the middle portion 30 when a person steps on the middle portion. The second distal end 24 has no openings in this alternative embodiment and instead provides enough space to allow the end 24 to be fastened to the form 40 during use. In a further embodiment, the second distal end 24 could be the mirror image of distal end 22, with two or more spaced openings 26. Alternatively, the second distal end 24 could be longer than distal end 22 to further offset an opening or openings 26 from the fold lines 42, 44 and the plane containing the fold lines.

These fold lines 42, 44 generally coincide with the surface of the concrete structure when the bracket 20 is embedded in concrete.

Figure 10:
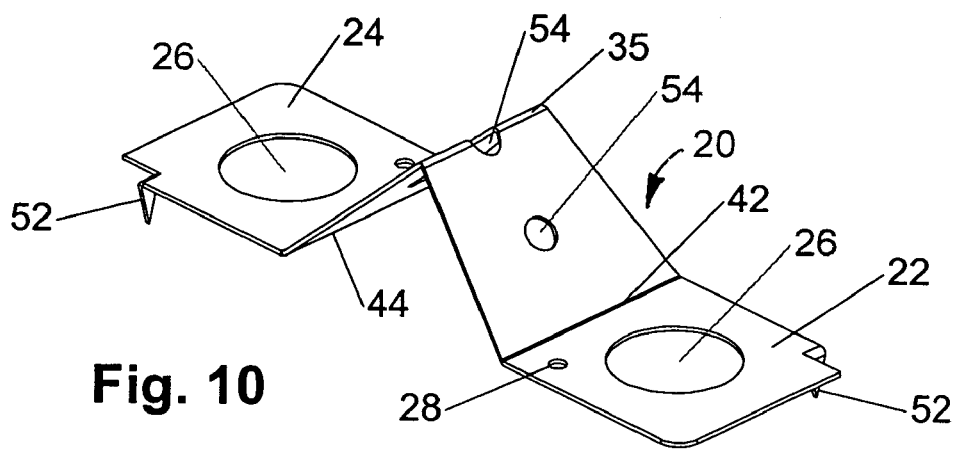
FIG. 10 is an upper perspective view of a further embodiment of the bracket of FIG. 1.
Figure 11:
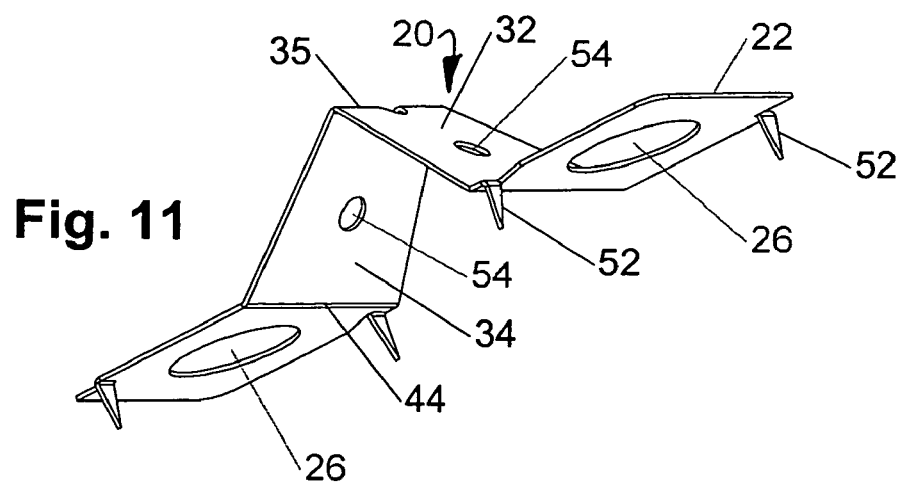
FIG. 11 is a lower perspective view of a further embodiment of the bracket of FIG. 1.

Referring to FIGS. 10-11, the bracket 20 can have prongs, stakes or spikes 52 formed thereon in addition to or in lieu of fastener holes 28. The prongs 52 can be formed by slitting and offsetting a portion of the distal end 22, 24 in which the stakes are formed. The prongs 52 are preferably formed with a pointed tip and preferably formed with a base that is wider than the tip, so that the tip of the stake can be embedded into the form 40. Any number of prongs can be formed, with the corners and lateral sides of the distal ends 22, 24 being preferable locations for these prongs 52.

Also shown in FIGS. 10-11 are holes 54 formed in middle portion 30 to allow concrete to flow through the holes 54 and better interlock and fasten the middle portion 30 to the concrete. Placing one or more holes 54 near the apex and fold line 35 also allows air to escape and thus ensures a better connection between the bracket 20 and the concrete. The location, size and number of the holes 54 will vary with the particular application in which the bracket 20 is used.

Figure 12:
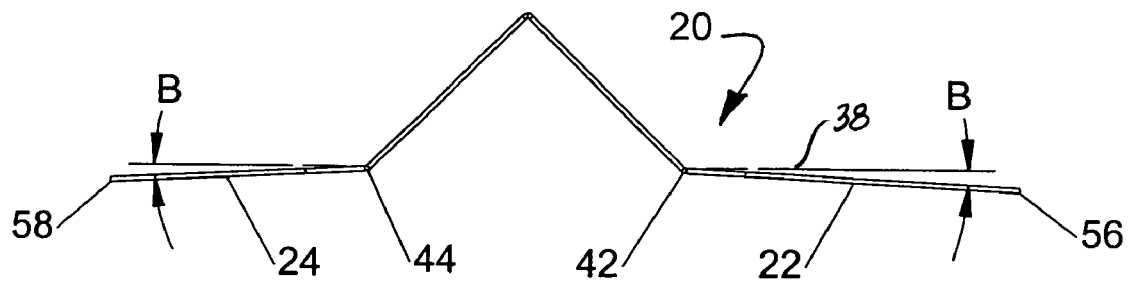
FIG. 12 is a further side view of the bracket of FIG. 1.

Referring to FIG. 12, a further embodiment is shown in which the distal ends 22, 24 still lie generally in the same plane. Advantageously, but optionally, the distal ends 22, 24 are slightly angled or curved so the distal ends 22, 24 are slightly bowed toward the side of form 40 that abuts the concrete and away from the concrete during use of the bracket 20. A bow having an angle $\beta$ of less than 10 degrees, and preferably about 2-3 degrees is believed preferable.

When the distal ends 22, 24 are fastened to the form 40 by fasteners 29 or prongs 52, the slight curve, bow or bend urges the distal edges 56, 58 of ends 22, 24, respectively, against the form 40 and inhibits concrete from getting between those distal edges 56, 58 and the form. If the distal edges 56, 58 extend away from the form 40 and into the concrete 46 then it is difficult to bend the ends 22, 24 away from the concrete so a device or pipe can be fastened to one or more of the ends 22, 24. If the distal edge 56, 58 is resiliently urged against the form 40 then the ends 22, 24 can be grabbed by pliers or a finger and pulled out of the concrete for use to mount desired devices or pipes, and any concrete between the distal edges 56, 58 and the adjacent fold lines 42, 44 will be thin and will shear off as the distal edges 56, 58 are moved away from the concrete.

In use, the bracket 20 is placed against the side of a form 40 which will abut the concrete 46. The distal ends 22, 24 are fastened to the form by prongs 52 or any of a variety of fasteners 29, with the fasteners preferably but optionally extending through pre-formed holes 28. Adhesives could be used but are not as desirable because of the long cure time. If at least one fastener is used on opposing sides of the raised middle portion 30, or if the opposing ends 22, 24 are otherwise fastened to the form 40, then when a worker steps on the bracket 20, the distal ends will not splay and move apart, and that stiffens and strengthens the middle portion so that it does not unacceptably deform from being stepped on. The prongs 52, fasteners 29, adhesives and other ways of fastening the ends 22, 24 to the form thus provide means for fastening the ends 22, 24 to prevent relative movement in the plane of form 40, and to strengthen the raised middle portion 30 and to prevent the unacceptable deformation of the raised middle portion when it is stepped on.

The ends 22, 24 need not be very long in order to restrain the raised middle portion 30 from splaying. Thus, if desired one of the ends 22, 24 could be made very short as shown in FIG. 9 by omitting the opening 26 in the selected short end 22, 24. Preferably though, both distal ends 22, 24 have one or more openings 26.

Figure 13:
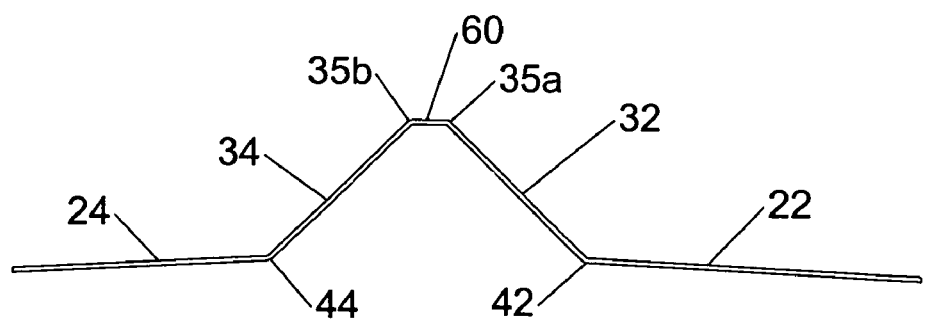
FIG. 13 is a side view of a further embodiment of the bracket of FIG. 1 with a different middle portion.
Figure 14:
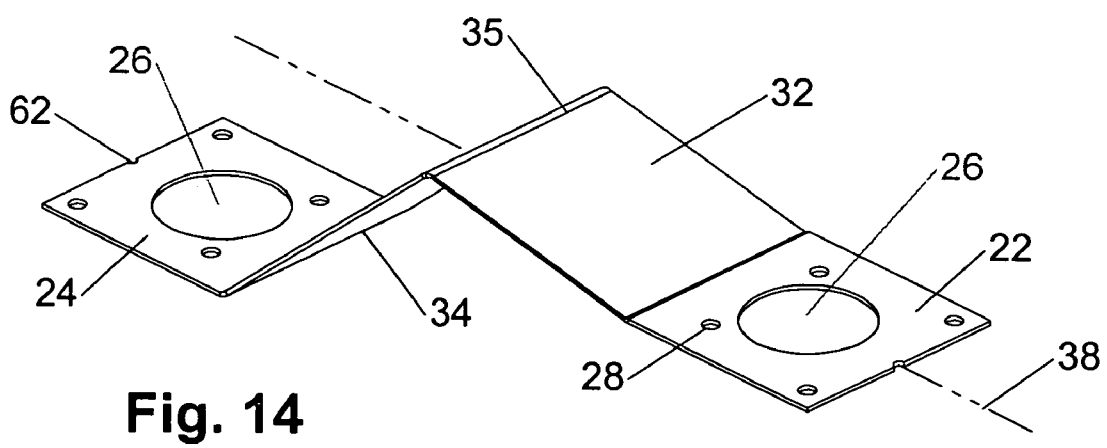
FIG. 14 is a perspective view of a further embodiment of the bracket of FIG. 1 in which the distal ends are laterally offset.
Figure 15:
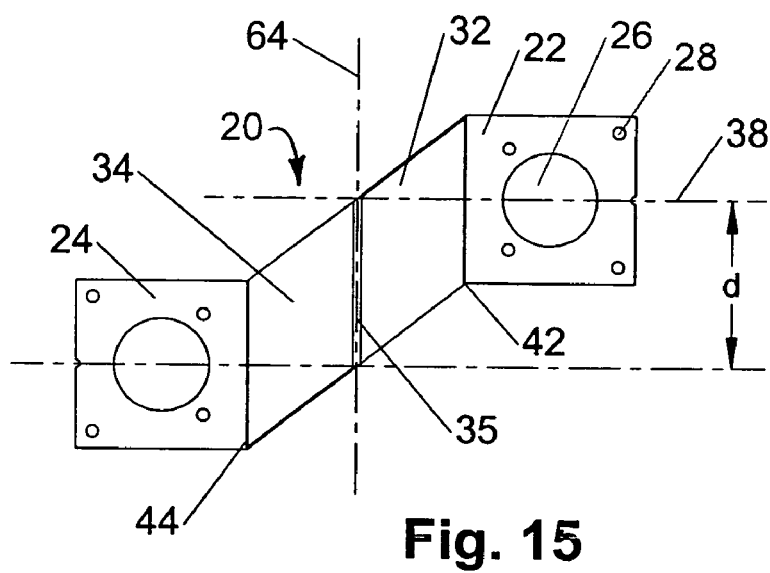
FIG. 15 is a top plan view of the bracket of FIG. 14.
Figure 17:
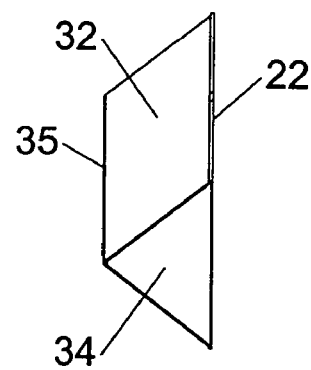
FIG. 17 is an end view of the bracket of FIG. 14, with the opposing end view being a mirror image thereof.
Figure 16:
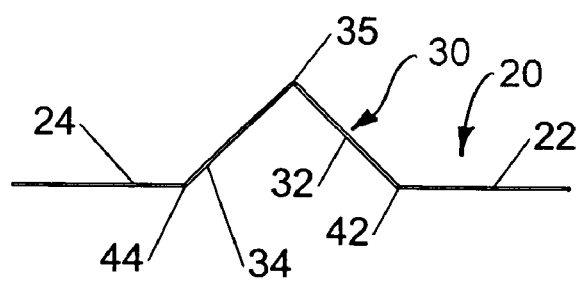
FIG. 16 is a front view of the bracket of FIG. 14.
Figure 18:
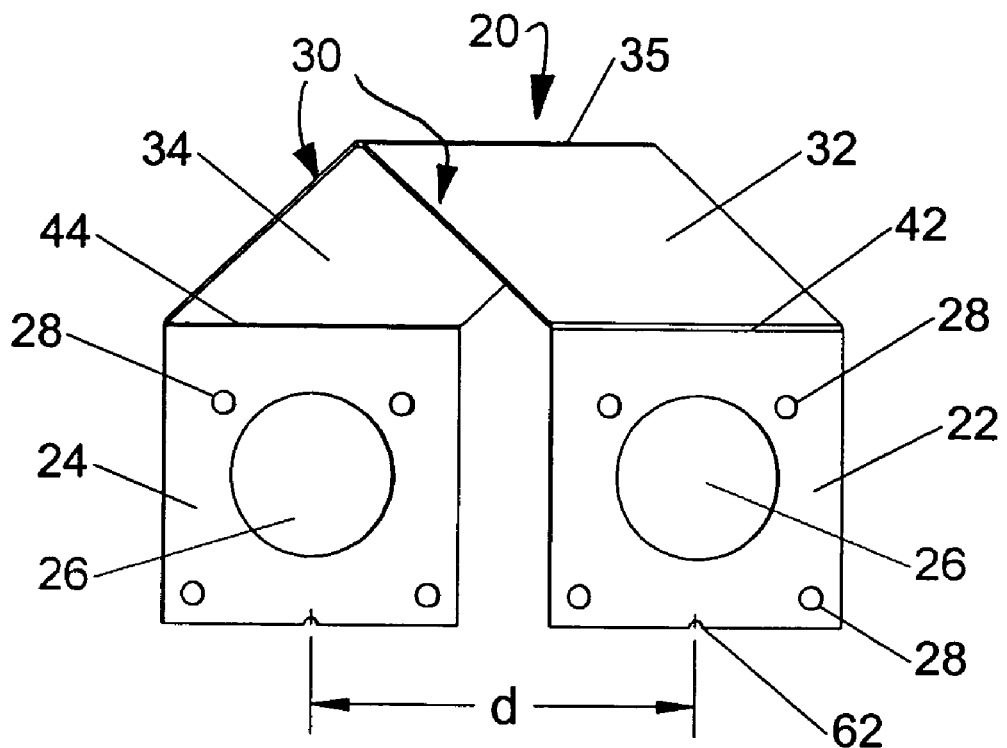
FIG. 18 is an end view of the bracket of FIG. 14 with the distal ends bent into a use position, and with the opposing end view being a mirror image thereof.

Referring to FIG. 13, the side portions 32, 34 could be joined by an intervening top portion 60 which is joined to the ends of the sides 32, 34 most distant from form 40 and from ends 22, 24. There are thus two ridge lines 35*a*, 35*b*. The middle portion 30 could thus assume a variety of shapes including flat or curved shapes. The top portion 60 has a distance between ridge lines 35*a*, 35*b* that is smaller than the distance between fold lines 42, 44, and that is advantageously less than half the distance between fold lines 42, 44 and that is preferably less than ¼ that distance. As the top portion 60 becomes larger, the side portions 32, 34 become more vertical and the raised middle portion is less able to withstand being stepped on. On the other hand, the larger the top portion 60, the more concrete is captured between the middle portion 30 and the form so a more secure mounting of the bracket 20 is achieved.

Referring to FIG. 2, the bracket 20 may be cut or stamped out of a strip or sheet of metal, or molded of plastic. The pattern on the metal looks similar to that of FIG. 2, except the side portions 23, 34 will be elongated as FIG. 2 shows them rising out of the image so they are foreshortened. The sequence of operations can vary, but the basic operations include punching or cutting out the opening(s) 26 and holes 28, and then punching or cutting any contoured sides. The sides are contoured to provide a narrow fold line 42, 44 and a longer ridge line 35, but the lines could be the same length and could be the same as the width of distal ends 22, 24 with no contours. If punched out of a plate, the plate is then cut into strips. Strips are then cut to length to form individual brackets 12, and in the process of cutting to length, a notch 62 is preferably, but optionally formed in the middle of each distal edge 56, 58. The notch 62 can be used to align the bracket 20 on the form 40 to ensure the openings 26 are correctly oriented when embedded in concrete. The fold lines 42, 44 and 35 are then formed and the brackets stacked or nested for storage and/or shipping.

In the above embodiments the distal ends 22, 24 were aligned along longitudinal axis 38, and laterally symmetric with respect to that longitudinal axis. Referring to FIGS. 14-18 a further embodiment is shown in which the bracket 20 has the distal ends 22, 24 laterally offset along an axis 64 by a distance "d" so that the openings 26 are laterally offset along a lateral axis that is preferably perpendicular to axis 38. The lateral offset causes the side portions 32, 34 to be skewed in shape, and to have a parallelogram shape if the lateral sides are parallel, and to have a trapezoidal shape of the width of the bracket 20 at the fold lines 42, 44 is different than at the fold line 35.

If the distal ends 22, 24 have openings 26 located in the center of each end and if the ends are of the same width then the openings 26 will be laterally offset the distance "d." That allows two structures, such as tubes 48, to be laterally spaced and held by bracket 20. The distal ends 22, 24 could have different lengths, different sized openings 26, and multiple openings 26, as described and shown in this specification.

The bracket 20 of FIGS. 14-18 is preferably formed of flat material, advantageously of metal or plastic, and more preferably stamped from galvanized steel plate or of stainless steel plate. To form the bracket 20, flat pieces of metal blank are advantageously stamped or cut out of a flat sheet of metal, with the blanks having the general shape shown in FIG. 15, but slightly longer because the middle portion 30 (side portions 32, 34) is not yet bent. The opening(s) 26, 54, holes 28, prongs 52 (FIGS. 10-11) and notch(es) 62 may be punched or cut (e.g., plasma or laser cutter) before or after the flat blank is formed. The blank is then bent to form the raised middle portion 30 and to form the bracket 20. The brackets may be stacked or nested to conserve space for shipping and storage.

Figure 19:
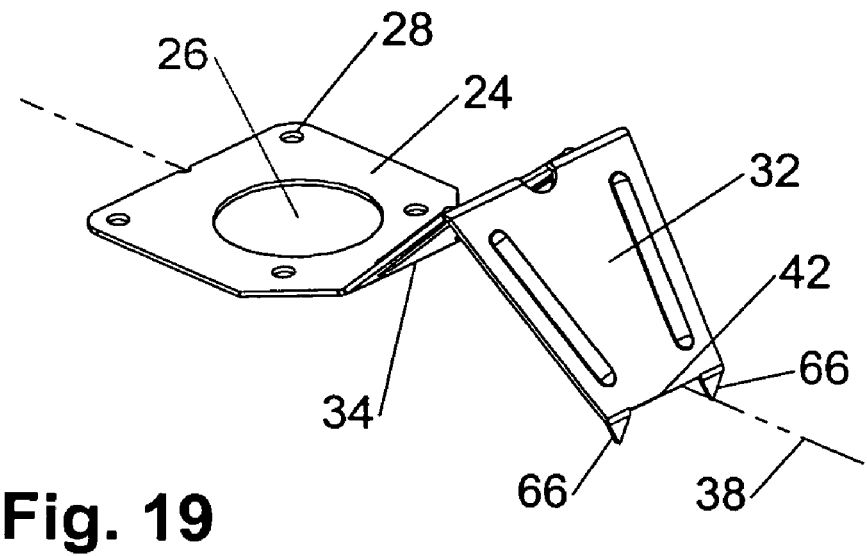
FIG. 19 is a further embodiment of the bracket of FIG. 1.

A still further embodiment is shown in FIG. 19 in which the first distal end 22 is omitted so that the distal edge of the middle portion terminates at what would normally be fold line 42. The first portion 32 has projections 66 along its distal edge, which in the depicted embodiment corresponds to fold line 42. The projections 66 are preferably shaped to releasably engage the form 40 (FIGS. 5-6) and to prevent movement of the first portion 32 along axis 38 and generally in the plane of the form 40. The projections preferably comprise members with pointed ends, and preferably having a triangular shape with the base of the triangle being on the distal edge of fold line 42 and the tip of the triangle oriented to embed itself in form 40 during use of the bracket. By fastening the bracket 20 to the form 40 on opposing sides of the raised middle portion 30 the middle portion is strengthened and can better withstand being stepped on by workers without being unacceptably deformed and so that it is adequately embedded in the concrete 46 (FIG. 5).

The distal ends 22, 24 provide means for supporting structures such as tubes 48. When the ends 22, 24 have openings 26 the ends are particularly suited to provide means for holding tubular structures 48, but other ways of fastening the tubes 48 can be used, including fastening other holding brackets to the bracket 20 and tubes 48. The inserts 50 provide a means interposed between the tube 48 and bracket 20 to further hold the tube. The openings 28 and fasteners 29, the prongs 52, the projections 66 and other fastening mechanisms for restraining movement of distal ends 22, 24, and for restraining movement of middle portion 30, provide various means for removably or releasably fastening the bracket 20 to the forms 40. The raised middle portion 30 provides means for fastening the bracket 20 to the concrete 46, with the distal ends 22, 24 being movable relative to the middle portion 30, preferably along defined fold lines 42, 44. The configuration of the raised middle portion 30 and fastening the ends 22, 24 to the form 40, provide means for resisting unacceptable deformation of the bracket 20 before use and during installation of the bracket.

The use of two distal ends 22, 24 allows a single tube 48 to be held by both ends if the openings 26 in each end are aligned, or it allows two tubes 48 to be held at different heights if the openings 26 in each end are not aligned, or it allows two tubes 48 to be held at the same height but laterally offset if the distal ends are laterally offset or if the distal ends extend laterally. Various arrangements can be provided using one or both distal ends 22, 24.

The middle portion 30 formed by the inclined sides 32, 34 preferably takes the form of a triangle or of an inverted "V" in order to strengthen the middle portion of the bracket. The stiffening ribs 36 can be added to the middle portion or elsewhere as needed or desired. Perforations can be added to the middle portion 30 as desired in order to alter the amount of interlock with the concrete 46 in which the middle portion is embedded.

Referring to FIGS. 20-23, the middle portion 30 is used as a mounting point for one or more additional fastening device, such as a machined or cold-headed standoff with internal (female) threads. A tube 70 having internal threads 72, an embedded end 74 and an exposed end 76 is fastened to the bracket 20, and preferably fastened to the middle portion 30.

Figure 20:
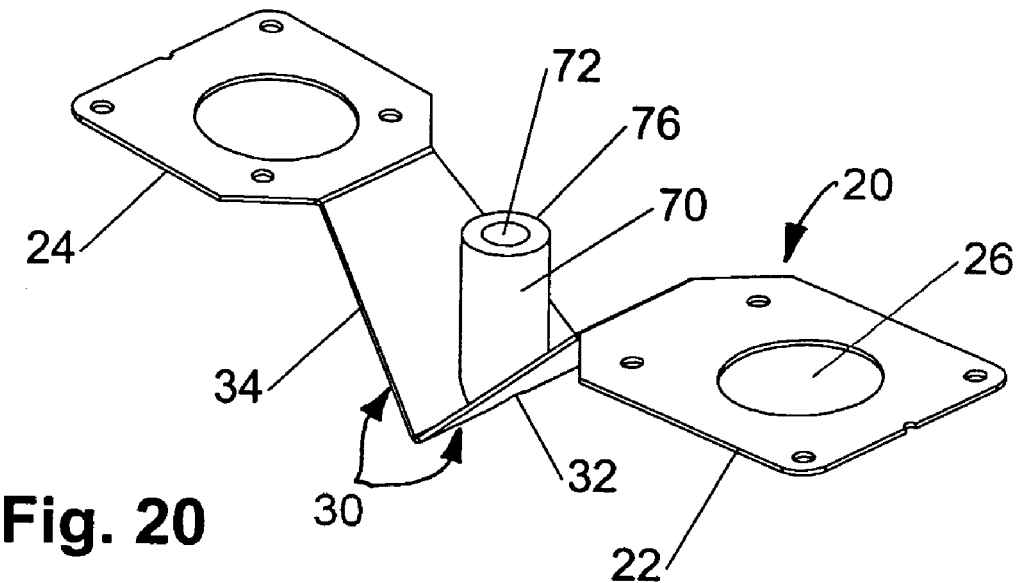
FIG. 20 is an inverted perspective view of a further embodiment of the bracket of FIG. 1 having a tube fastened thereto.
Figure 21:
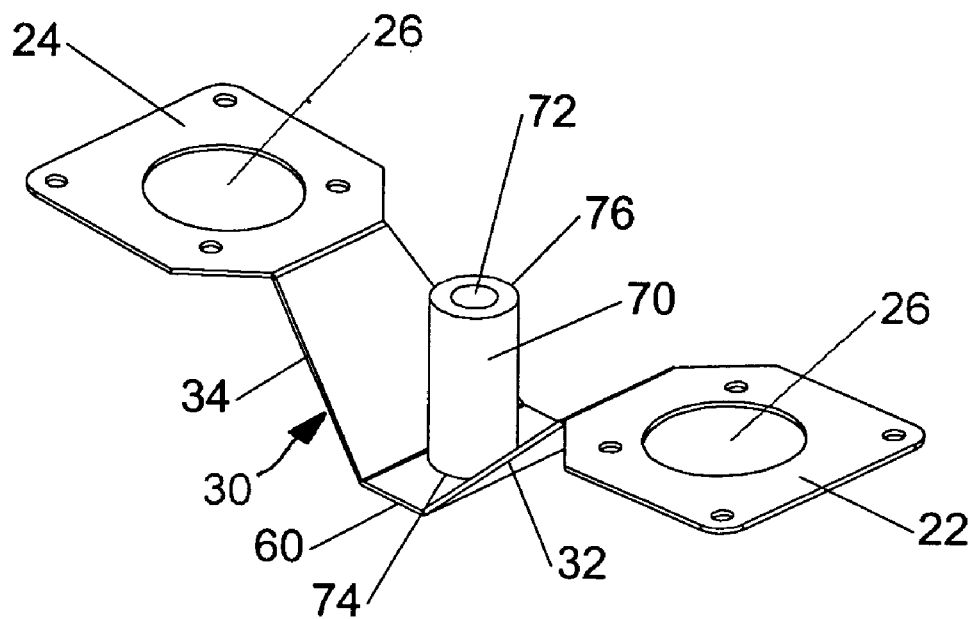
FIG. 21 is an inverted perspective view of a further embodiment of the bracket of FIG. 13 having a tube fastened thereto.

FIG. 20 shows the embedded end 74 of the tube 70 abutting the side portions 32, 34 and being fastened to them, preferably permanently as by welding, soldering, brazing, or gluing, etc. FIG. 21 shows the embedded end 74 of the tube 70 abutting the top portion 60 and preferably being fastened to the top portion as by welding, etc. The tube 70 is advantageously fastened to the bracket 20 sufficiently so that the orientation of the tube relative to the concrete form 40 does not alter. Advantageously, the tube is rigidly fastened to the bracket 20 so that the bracket 20 helps restrain the tube from being pulled out of the concrete after the tube and bracket are embedded in the concrete. Thus, having the tube 70 welded to the bracket or fastened in another structurally strong manner, is preferred. Moreover, the tube 70 can help support and strengthen the bracket 20 against deformation when a worker steps on the bracket. A strong connection between the tube 70 and bracket 20 is preferred for this additional purpose. But a looser connection between the tube 70 and bracket 20 could be used, with the bracket merely positioning the tube, and with outwardly projecting members on the tube being provided to embed in the concrete 46 and prevent the tube 70 from being pulled out of the concrete.

Figure 22:
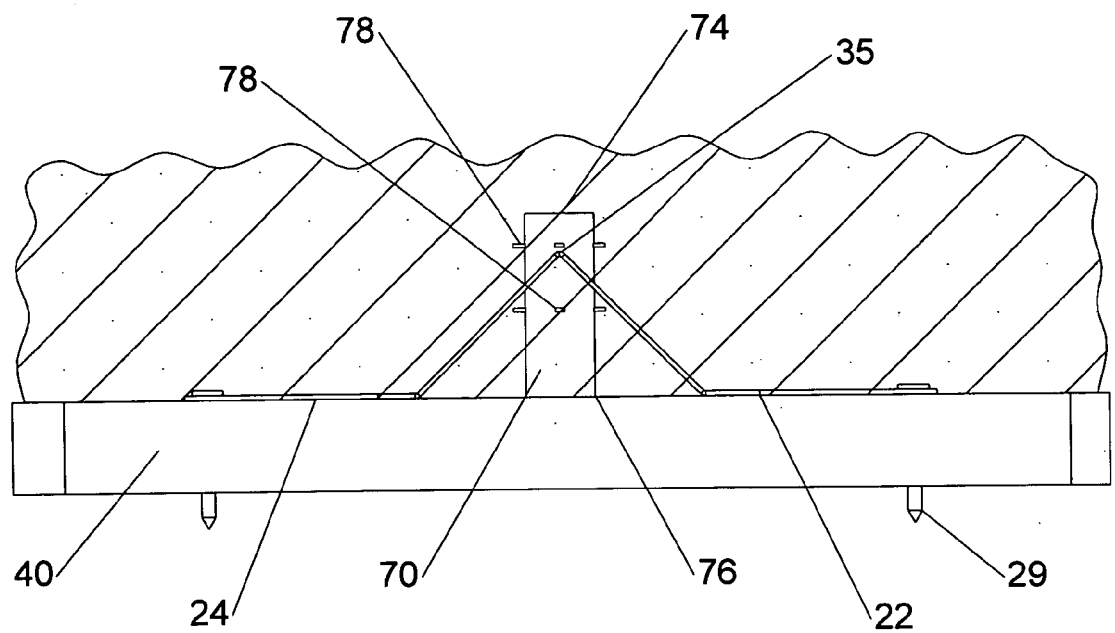
FIG. 22 is a side view of a bracket of FIG. 1 having a tube fastened thereto.
Figure 23:
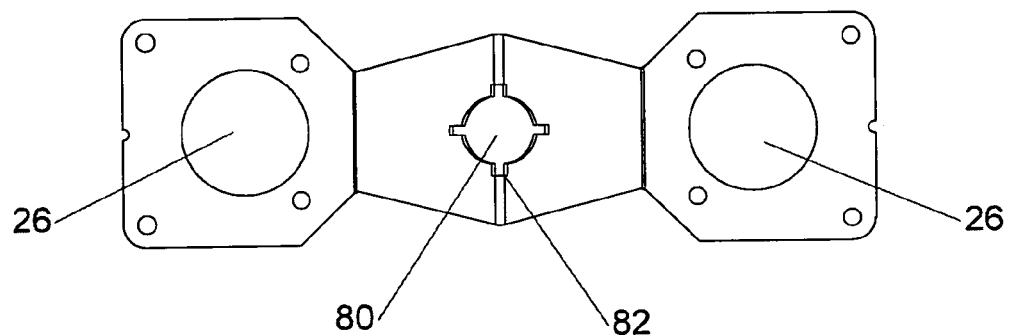
FIG. 23 is a plan view of the bracket of FIG. 22 without the tube.

Removable fastening mechanisms could be used to fasten the tube 70 to the bracket 20. For example, using external threads on the outside of tube 70 to engage mating threads on a hole in the middle portion 30 could fasten the parts together. Referring to FIGS. 22-23, other removable locking mechanisms could be used, such as protrusions 78 on the exterior of the tube 70 cooperating with a shaped aperture 80 in the middle portion 30 to allow the protrusions 78 to pass when aligned with the shaped aperture, but restricting axial movement when the protrusions 78 are rotated about the tube's longitudinal axis, as in a bayonet lock. The shaped aperture 80 has a central aperture shaped to conform to the tube 70, which is shown as a cylinder for illustration. At least one and preferably has a plurality of radially extending openings 82 are located on the periphery of the circular aperture 80 so allow one or more of the protrusions 78 and tube 70 to pass through the bracket 20.

As shown in FIGS. 20-21, the tube 70 preferably does not pass through the bracket 20 and side portions 32, 34 so as to allow the middle portion 30 to provide a broader protective cap over the end of the tube that might be stepped on by workers. But the tube 70 can extend past the middle portion 30 and its side portions 32, 34 as shown in FIG. 22, in case a longer tube 70 is needed, as for example to allow greater adjustment along the axial length of the tube 70 for whatever device is fastened to the tube 70. Advantageously the tube 70 does not extend much beyond the bracket 20, and preferably does not extend more than about half the height of the bracket measured as the distance between the distal ends 22, 24 and the ridge 35 or top portion 60. The tube 70 can extend further, but if so it is advantageous to cap the end with protective devices. If a long tube 70 is needed, it is desirable to increase the length of the side portions 32, 34 to provide support for the tube 70.

If the embedded end 74 of tube 70 extends past the bracket 20, then the embedded end 74 is preferably blocked as by a cap, a plug or crimping, so that concrete 46 does not enter the interior of the tube. If the tube 70 does not extend past the bracket 20, then it may be possible, but is less desirable, to leave the embedded end 76 open. The middle portion 30 will inhibit concrete 46 from flowing into the tube 70, but because it is desirable to have concrete 46 completely entrain the middle portion and tube 70, some concrete may enter the embedded end 76. A small amount of concrete in the embedded end 76 may be acceptable, depending on the use of the tube 70. Thus, it is generally preferable to block concrete 46 from entering the embedded end 76 but it may not be needed in all instances.

The tube 70 is preferably sized so that it has a length causing the exposed end 74 to be in substantially the same plane as the distal ends 22, 24 when the bracket 20 is fastened to the concrete form 40 (FIG. 22) so that the exposed end 74 abuts the form 40 to prevent concrete from entering the inside of the tube 70. A cap or plug could be used to ensure concrete does not enter the tube 70.

Referring to FIG. 22, in use, when the distal ends 22, 24 of the bracket 20 are nailed down by nails 29 or otherwise fastened to form 40, the exposed end 74 is forced tightly against the wooden form 40, preventing the poured concrete from entering the tube. When the form 40 is removed, the bracket 20 now has an additional exposed mounting device in the form of an internally threaded tube 70 embedded in the concrete 46. Such an embedded tube 70 extends the versatility of the bracket 20 by allowing the direct attachment of threaded rod to the tube 70, which is a standard method of suspending objects from ceilings.

While the above illustrative embodiments use a single tube 70, more than one tube 70 could be used. Moreover, the orientation of the tubes 70 could vary and need not be perpendicular to the form 40. Likewise, the orientation of a single tube 70 need not be perpendicular to the form 40 and distal ends 22, 24 of the bracket 20, and need not be perpendicular to the resulting surface of the concrete 46.

If the exposed end 74 of the tube is sufficiently close to the form 40, then only a thin layer of concrete will separate the end 74 from exposure and any such concrete could be chipped away easily to expose the exposed end 74. If a thin layer of concrete is to cover the exposed end 74, then the exposed end is preferably blocked to avoid concrete becoming embedded in the interior of the tube 70. If a thin layer of concrete is to be interposed between the distal end 74 and the form 40, the concrete is preferably less than about 0.1 inches thick (about 2-3 mm).

The bracket 20 must be embedded sufficiently to adequate to support the weight held by tube 70 and/or the distal ends 22, 24 without pulling out of the concrete, and preferably without cracking the concrete 46 in which the bracket is embedded. Thus, the configuration and size of the bracket 20 will vary according to the particular use.

The exposed end 74 of the tube 70 is preferably perpendicular to the concrete form 40 during installation, and thus is perpendicular to the surface of the concrete 46 when the bracket 20 is embedded in the concrete. The tube 70 advantageously has a larger diameter opening with larger diameter threads adjacent the exposed end 74, and has a smaller diameter opening with smaller diameter threads more toward the embedded end 76. That allows two different diameter rods or shafts to be threaded into the tube 70 when it is embedded in the concrete 46. Advantageously the larger diameter threads are about 3/8 inch diameter and the smaller diameter threads are 1/4 inch diameter. But different diameters can be used depending on the particular use of the bracket 20. The length of the threaded sections will vary depending on the use of the bracket 20, as it must be long enough to bear the load placed on the tube 70.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of forming the distal ends 22, 24 and of fastening various structures and tubes 48 to the bracket 20, and various shapes for the middle portion 30 that is embedded in the concrete. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A support bracket for fastening to a concrete molding form, the bracket comprising:
    a first and second distal end connected by a middle portion, the distal ends being generally in a first plane in a first position when fastened to the form and the middle portion having two flat portions each extending from one of the distal ends along a defined fold line associated with the distal end, each flat portion extending at an obtuse angle relative to the distal end from which the middle portion extends and joining to form the middle portion, the middle portion being embedded in concrete; and
    means for releasably fastening at least one of the distal ends to the form when the at least one end is in the first position; and
    further comprising an opening having a continuous periphery located in at least one of the distal ends sized to receive a tube of predetermined size sufficient to allow one of a water pipe or gas pipe or electrical conduit to pass through the opening when said at least one of the distal ends is in a second position not attached to the form and bent away from the concrete, and
    one of a water pipe, gas pipe or electrical conduit passing through said opening.

2. The bracket of claim 1, wherein the fastening means comprises at least one hole in each of the distal ends with the hole being sized to accept a fastener.

3. The bracket of claim 1, wherein the fastening means comprises at least one prong formed from at least one of the distal ends and extending away from the middle portion.

4. The bracket of claim 1, wherein the middle portion comprises two side portions each of which is inclined at an obtuse angle relative to the associated distal end.

5. The bracket of claim 1, wherein the bracket is formed from a flat strip of metal.

6. The bracket of claim 1, wherein the middle portion comprises two side portions, each having a trapezoidal shape.

7. The bracket of claim 1, wherein the middle portion comprises two side portions each having a first width where the side portion joins one of the distal ends and having a second width where the side portions join each other.

8. The bracket of claim 7, wherein first width is smaller than the second width.

9. The bracket of claim 1, wherein first and second side portions join each other at an angle of between about 75-105 degrees.

10. The bracket of claim 1, further comprising stiffening ribs formed on the middle portion.

11. The bracket of claim 1, further comprising two openings in at least one of the distal ends with each opening sized to receive a tube of predetermined size.

12. The bracket of claim 1, further comprising a plurality of openings in at least one of the distal ends with at least one opening sized to receive a tube of predetermined size.

13. The bracket of claim 1, wherein each distal end has a length and the length of one distal end is longer than the length of the other distal end and each end contains said opening, with each opening located a different distance from the defined fold line of that end when the distal end is in the first position.

14. The bracket of claim 1, wherein each distal end has a width and the width of one distal end is greater than the width of the other distal end.

15. The bracket of claim 1, wherein each distal end has said opening, and wherein said opening in each distal end is located a distance from the fold line of that distal end which distances differ by at least the size of the opening in one of the distal ends when the distal end is in the first position.

16. The bracket of claim 1, wherein the distal ends are laterally offset from each other.

17. The bracket of claim 1, wherein the distal ends are each fastened to the form when the distal ends are in the first position.

18. The bracket of claim 1, wherein the distal ends are each fastened to the form when the distal ends are in the first position and concrete abuts the form and entrains the middle portion but is not interposed between the distal ends and the form.

19. The bracket of claim 1, wherein a first surface of each distal end abuts the concrete when each distal end is in the first position and an opposing second surface of each distal end faces away from the concrete when each distal end is in the first position and the middle portion has a vent opening with a continuous periphery so the opening vents air when the middle portion is being filled with concrete, the vent opening having a portion extending into each of the two flat portions.

20. The bracket of claim 19, wherein the middle portion is embedded in concrete having a surface in the plane.

21. The bracket of claim 19, wherein the middle portion is embedded in concrete having a surface in the plane, and wherein each distal end is bent substantially perpendicular to that concrete surface.

22. The support bracket of claim 1, further comprising a tube fastened to the bracket and having an embedded end and an opposing exposed end with the interior of the tube having internal threads that are threadingly accessible through the exposed end, the exposed end lying in generally the first plane.

23. The support bracket of claim 22, wherein the embedded end of the tube is fastened to the middle portion of the bracket.

24. The support bracket of claim 22, wherein the embedded end of the tube is fastened to the middle portion of the bracket and is blocked to prevent the entry of concrete.

25. The support bracket of claim 22, wherein the embedded end of the tube is fastened to the middle portion of the bracket and the exposed end of the tube is blocked to prevent entry of concrete.

26. The support bracket of claim 22, wherein the tube is fastened to the middle portion of the bracket at a location on the tube which lies between the embedded end and the exposed end.

27. The support bracket of claim 22, wherein the tube is releasably fastened to the middle portion of the bracket.

28. The support bracket of claim 22, wherein the interior of the tube has two thread diameters with a first thread diameter adjacent the exposed end and a second thread diameter toward the embedded end of the tube.

29. The support bracket of claim 1, further comprising:
a tube fastened to the bracket and having an embedded end and an opposing exposed end with the interior of the tube having internal threads that are threadingly accessible through the exposed end, the exposed end lying in generally the first plane.

30. The support bracket of claim 29, wherein the at least one distal end has an opening extending through the sheet material and sized to accept a tube of predetermined diameter.

31. The support bracket of claim 29, further comprising means for releasably fastening opposing ends of the middle portion to the form.

32. The support bracket of claim 29, further comprising means on the bracket for enabling opposing ends of the middle portion to be releasably fastened to the form.

33. The support bracket of claim 29, wherein there are two distal ends, at least one distal end having an opening extending through the sheet material and sized to accept a tube of predetermined diameter when said at least one end is in the second position.

34. The support bracket of claim 29, wherein the embedded end of the tube is fastened to the middle portion of the bracket.

35. The support bracket of claim 29, wherein the embedded end of the tube is fastened to the middle portion of the bracket and is blocked to prevent the entry of concrete.

36. The support bracket of claim 29, wherein the embedded end of the tube is fastened to the middle portion of the bracket and the exposed end of the tube is blocked to prevent entry of concrete.

37. The support bracket of claim 29, wherein the tube is fastened to the middle portion of the bracket at a location on the tube which lies between the embedded end and the exposed end.

38. The support bracket of claim 29, wherein the interior of the tube has two thread diameters with a first thread diameter adjacent the exposed end and a second thread diameter toward the embedded end of the tube.

39. The support bracket of claim 29, wherein there are two distal ends and wherein the interior of the tube has two thread diameters with a first thread diameter adjacent the exposed end and a second thread diameter toward the embedded end of the tube.

40. The support bracket of claim 29, wherein there are two distal ends and wherein the interior of the tube has two thread diameters with a first thread diameter adjacent the exposed end and a second thread diameter toward the embedded end of the tube, and further comprising means for fastening the distal ends to a concrete form during use of the device.

41. The support bracket of claim 29, wherein the tube is located only between the middle portion of the bracket and first plane.

42. The support bracket of claim 29, wherein the tube extends beyond the middle portion so that the embedded end of the tube is more deeply embedded in concrete than the middle portion during use of the bracket.

43. The support bracket of claim 29, wherein the middle portion has a top portion having a flat surface to which the embedded end of the tube is fastened.

44. The support bracket of claim 29, wherein the middle portion has a top portion having a flat surface through which the tube extends so the embedded end of the tube is further from the at least one distal end of the bracket than is the top portion.

45. A support bracket for fastening to a concrete molding form, the bracket being formed of sheet material and comprising:
first and second distal ends connected by a raised middle portion that is embedded in concrete, the distal ends being generally in a first plane when in a first position and the middle portion extending from each distal end an amount sufficient to be embedded in concrete during use of the bracket, at least one distal end having an opening with a continuous periphery which opening extends through the sheet material and is sized to accept a tube of predetermined diameter sufficient to allow one of a water pipe or gas pipe to pass through the opening during use of the bracket, and one of a water pipe, gas pipe or electrical conduit passing through said opening when at least one of the distal ends is in a second position bent away from the concrete sufficiently to allow passage of the pipe or conduit.

46. The support bracket of claim 45, wherein the middle portion includes two side portions extending at an obtuse angle relative to the associated distal end in the first position.

47. The support bracket of claim 45, wherein the distal ends are laterally offset from each other when the distal ends are in the first position.

48. The support bracket of claim 45, wherein the distal ends each have at least one opening sized to accept a tube of predetermined diameter, and wherein the openings are laterally offset from the middle portion by different distances when the distal ends are in the first position.

49. The support bracket of claim 45, further comprising means for releasably fastening opposing ends of the middle portion, wherein the means comprises at least one hole in each distal end sized to allow a fastener to pass therethrough and fasten the distal end to the form.

50. The support bracket of claim 45, wherein the means comprises at least one prong formed in the distal end.

51. The support bracket of claim 45, further comprising a tube fastened to the bracket and having an embedded end and an opposing exposed end with the interior of the tube having internal threads that are threadingly accessible through the exposed end, the exposed end lying in generally the first plane.

52. The support bracket of claim 51, wherein the embedded end of the tube is fastened to the middle portion of the bracket.

53. The support bracket of claim 51, wherein the embedded end of the tube is fastened to the middle portion of the bracket and is blocked to prevent the entry of concrete.

54. The support bracket of claim 51, wherein the embedded end of the tube is fastened to the middle portion of the bracket and the exposed end of the tube is blocked to prevent entry of concrete.

55. The support bracket of claim 51, wherein the tube is fastened to the middle portion of the bracket at a location on the tube which lies between the embedded end and the exposed end.

56. The support bracket of claim 51, wherein the interior of the tube has two thread diameters with a first thread diameter adjacent the exposed end and a second thread diameter toward the embedded end of the tube.

57. A support bracket for fastening to a concrete molding form, the bracket comprising:

a first and second distal end connected to a middle portion along first and second fold lines, the distal ends being generally in a first plane when in a first position and the middle portion extending from a side of each distal end at an obtuse angle relative to that plane, the middle portion being embedded in concrete;

wherein each distal end has an opening in it, which opening has a continuous periphery and is large enough to allow one of a water pipe or gas pipe to pass through the opening, each opening being located a distance from the fold line of that distal end, with the distances being different, and one of a water pipe, gas pipe or electrical conduit passing through at least one of said openings when said at least one of said openings is in a distal end located in a second position to allow passing of the pipe or conduit.

58. The bracket of claim 57, wherein the distances differ by at least the size of the opening in one of the distal ends.

59. A support bracket for fastening to a concrete molding form, the bracket comprising:

a first and second distal end connected to a middle portion along first and second fold lines, the distal ends being generally in a first plane when in a first position and the middle portion extending from a side of each distal end at an obtuse angle relative to that plane, the middle portion being embedded in concrete;

at least one fastener hole in each distal end with the fastener hole sized to allow the shank of a fastener to pass therethrough to fasten the distal end to the form; and wherein each distal end has an opening in it, which opening has a continuous periphery with the opening size so that a tube with a diameter of at least about ½ inch passes through the opening when said distal end is in a second position away from the concrete, each opening being located a distance from the fold line of that distal end.

60. The support bracket of claim 59, wherein the distances between each of said openings and the adjacent fold line is different.

61. The support bracket of claim 59, wherein the distances between each opening and the adjacent fold line differ by more than a diameter of one of the openings.

62. The support bracket of claim 59, wherein at least one distal end has more than one of the openings in it.

63. The support bracket of claim 59, wherein each distal end has more than one of the openings in it.

64. The support bracket of claim 59, further comprising a plurality of fastener holes sized for the shank of fasteners to pass therethrough.

65. A support bracket for fastening to a concrete molding form, the bracket being formed of sheet material and comprising:

first and second distal ends connected by a raised middle portion, the distal ends being generally in a first plane and the middle portion extending from each distal end an amount sufficient to be embedded in concrete and being embedded in concrete, at least one distal end having therein an opening with a tube of at least about ½ inch in diameter passing therethrough when said at least one distal end is not in the first plane, the opening having a continuous periphery.

66. The support bracket of claim 65, further comprising a plurality of fastener holes sized for the shank of fasteners to pass therethrough.

67. The support bracket of claim 66, wherein each distal end at least one of said openings therein.

68. The support bracket of claim 67, wherein each opening is located a distance from the a fold line and the distance from the fold line to the adjacent opening is different for each distal end.

69. The support bracket of claim 66, wherein each distal end has a length and the length of one distal end is longer than the length of the other distal end and each distal end contains at least one opening, with a center of each opening located a different distance from a fold line of that end, with said distances differing by more than the diameter of one of said openings.

70. The support bracket of claim 66, wherein the openings are between about ½ inch and 1 inch in diameter.

* * * * *